March 30, 1926.
A. G. HEROLD
COMBINED COFFEE SACK AND HOLDER
Filed March 14, 1924
1,578,314
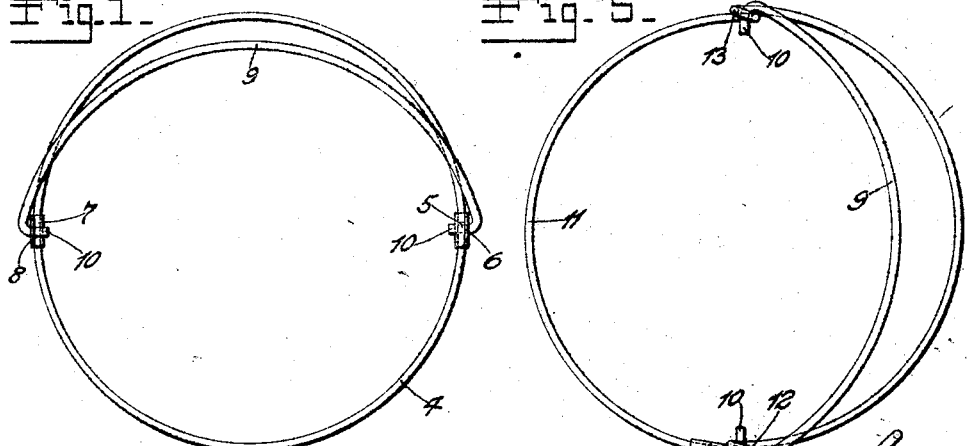
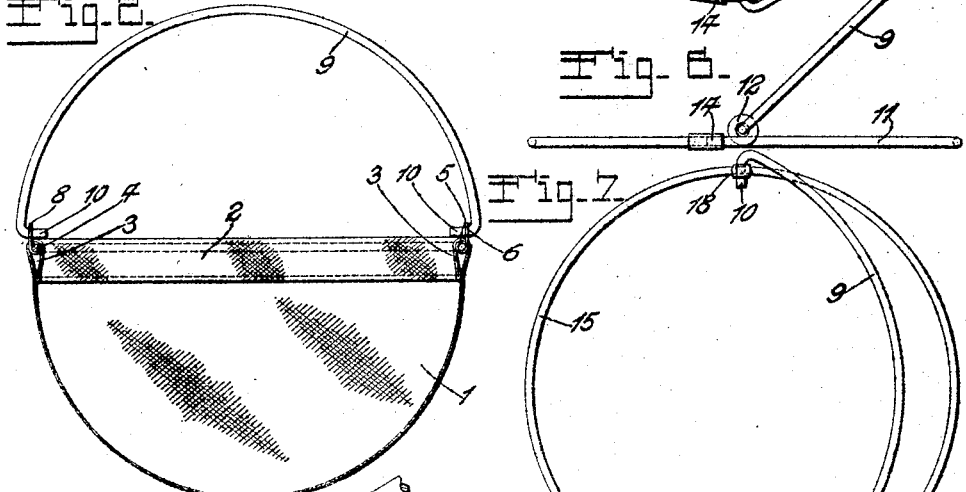
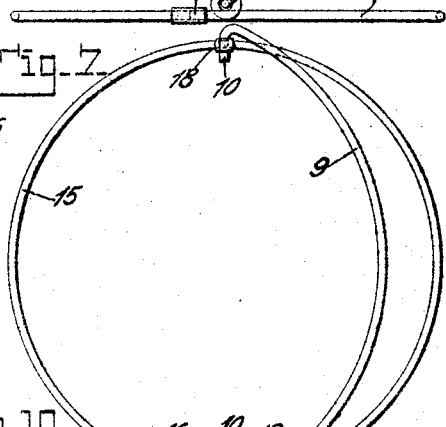
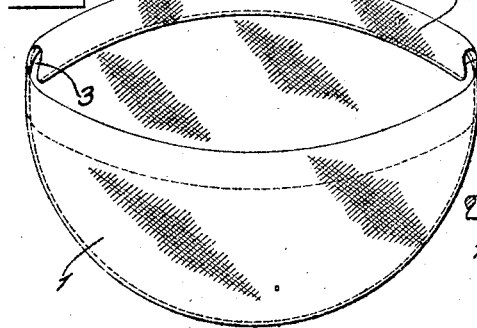
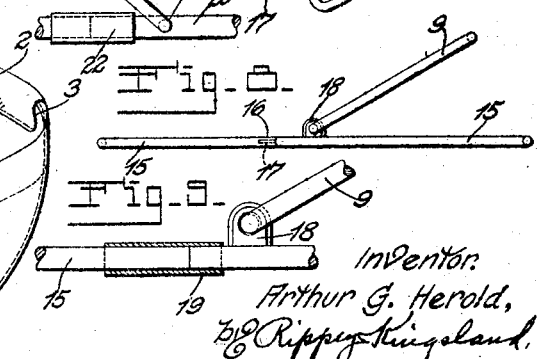
Inventor:
Arthur G. Herold,
Rippey Kingsland,
His Attorneys.

Patented Mar. 30, 1926.

1,578,314

UNITED STATES PATENT OFFICE.

ARTHUR G. HEROLD, OF ST. LOUIS COUNTY, MISSOURI.

COMBINED COFFEE SACK AND HOLDER.

Application filed March 14, 1924. Serial No. 699,351.

*To all whom it may concern:*

Be it known that I, ARTHUR G. HEROLD, a citizen of the United States, residing at St. Louis County, Missouri, have invented a new and useful Combined Coffee Sack and Holder, of which the following is a specification.

This invention is a combined coffee sack and holder.

My invention comprises a sack having a loop at its open end with diametrically opposite openings in the loop, a split ring adapted to be passed endwise through the loop and having ears for receiving the ends of a bail, and novel means for holding the ends of the ring in proper form.

Another object of the invention is to provide a supporting ring for a coffee sack having its ends adjacent to one of the bail receiving ears, and means in connection with one of the ends for receiving the other end of the ring to hold the same in proper form.

Other objects will appear from the following description, reference being made to the drawing in which—

Fig. 1 is a plan view of one form of the invention.

Fig. 2 is a cross sectional view of the form of ring shown in Fig. 1 and the coffee sack in connection therewith.

Fig. 3 is a detailed view showing the device for holding the ends of the ring together and for receiving one end of the bail.

Fig. 4 is a perspective view of the coffee sack.

Fig. 5 is a plan view of another form of the invention.

Fig. 6 is a side elevation of the device shown in Fig. 5.

Fig. 7 is a plan view, with a part in section, of another form of the invention.

Fig. 8 is a side elevation of the device shown in Fig. 7.

Fig. 9 is a detailed view of the form of device shown in Fig. 6 for holding the ends of the ring together.

Fig. 10 is a view showing a modified form of connection between the bail and the ring.

The sack 1 has a loop 2 around its open end for receiving the split ring provided with diametrically opposite holes 3 for receiving the ears on the ring. The ring 4 shown in Figs. 1, 2 and 3 is a split ring having a tubular member 5 rigidly connected with and extending beyond one end a distance sufficient to permit the opposite end to be inserted therein and withdrawn therefrom. An ear 6 is formed in connection with the part 5. The part 5 and the ear 6 may be formed by rolling a piece of sheet metal to form the tube, leaving one edge portion of the sheet metal extended to provide the ear 6. A similar tube part 7 with an ear 8 in connection therewith is attached to the diametrically opposite part of the ring.

The split ring is adapted to be passed endwise through the loop 2 until the ears 6 and 8 extend through the openings 3. The bail 9 has inwardly extended hooks 10 to be passed through the holes in the ears to support the device when needed.

In the form of the invention shown in Figs. 5 and 6 the split ring 11 is coiled near one end to form an ear 12 and is also coiled intermediate of its ends to form a diametrically opposite ear 13 for receiving the hooks 10 of the bail 9.

The end of the ring near which the loop 12 is formed has a tubular part 14 rigidly attached thereto and extending therefrom a sufficient distance to receive the opposite end of the ring. This ring is applied and removed in the same manner as the ring previously described.

The ring 15 shown in Figs. 7 and 8 is a split ring having a tubular end 16 for receiving the reduced projection 17 on the other end, thus holding the ring in proper annular form and permitting the ring to be opened for insertion into and withdrawal from the loop of the sack. Diametrically opposite ears 18 are attached to the ring 6 one being near one end of the ring and the other diametrically opposite therefrom. Said ears receive the hooks 10 of the bail 9.

As an alternative to the formation of the tubular part 16 integral with one end of the ring a separate tubular part 19 may be attached to the end of the ring near which one of the ears 18 is located, said tubular part extending a sufficient distance to receive the other end of the ring.

In the modification shown in Fig. 10 the split ring 20 has diametrically opposite holes 21 therethrough for receiving the hooks 10 of the bail 9. One end of the ring adjacent to one of the holes 21 has a sleeve 22 rigid thereon to receive the opposite end of the ring.

This invention is an improvement upon the device disclosed in my Patent No.

1,466,165, dated August 28, 1923, and may be applied to similar uses.

What I claim and desire to secure by Letters Patent is:

A device of the character described comprising a split resilient ring the ends of which are held close together by the resiliency of the ring, a tubular part rigid with and extending beyond one end of the ring forming telescoping connection with the opposite end of the ring and holding the two ends of the ring approximately in abutting contact and in circular alinement, a bail, and means forming pivot connection for one end of the bail with that end portion of the ring with which said tubular part is rigid and the opposite end of the bail diametrically opposite.

ARTHUR G. HEROLD.